(12) United States Patent
Stoller et al.

(10) Patent No.: US 8,216,533 B2
(45) Date of Patent: Jul. 10, 2012

(54) METHOD FOR PRODUCING AMMONIUM PARATUNGSTATE HYDRATES AND AMMONIUM PARATUNGSTATE DECAHYDRATE

(75) Inventors: Viktor Stoller, Bad Harzburg (DE); Michael Erb, Salzgitter (DE); Juliane Meese-Marktscheffel, Goslar (DE); Michael Lohse, Goslar (DE); Klaus-Jürgen Marschall, Goslar (DE); Frank Schrumpf, Goslar (DE)

(73) Assignee: H.C. Starck GmbH (DE)

( * ) Notice: Subject to any disclaimer, the term of this patent is extended or adjusted under 35 U.S.C. 154(b) by 84 days.

(21) Appl. No.: 12/524,957

(22) PCT Filed: Jan. 29, 2008

(86) PCT No.: PCT/EP2008/050995
§ 371 (c)(1),
(2), (4) Date: Aug. 19, 2009

(87) PCT Pub. No.: WO2008/092837
PCT Pub. Date: Aug. 7, 2008

(65) Prior Publication Data
US 2010/0098619 A1    Apr. 22, 2010

(30) Foreign Application Priority Data
Feb. 2, 2007    (DE) ................. 10 2007 005 286

(51) Int. Cl.
*B01D 11/00*    (2006.01)
*C01G 37/00*    (2006.01)
*C01G 39/00*    (2006.01)
*C01G 41/00*    (2006.01)
*C01G 41/02*    (2006.01)
*C22B 34/30*    (2006.01)

(52) U.S. Cl. .............. 423/56; 423/54; 423/594.13
(58) Field of Classification Search .......... 423/54, 423/56, 594.13
See application file for complete search history.

(56) References Cited

U.S. PATENT DOCUMENTS
3,158,438 A * 11/1964 Kurtak ................. 423/54
(Continued)

FOREIGN PATENT DOCUMENTS
DE    1150962    7/1963
DE    1244141    7/1967

OTHER PUBLICATIONS

Lassner, Eric. "From Tungsten Concentrates and Scrap to Highly Pure Ammonium Paratungstate (APT)", Int. J. of Refractory Metals and Hard Materials 13 (1995) 35-44.*

(Continued)

*Primary Examiner* — Stanley Silverman
*Assistant Examiner* — Anthony J Zimmer
(74) *Attorney, Agent, or Firm* — Connolly Bove Lodge & Hutz LLP

(57) ABSTRACT

The invention is directed to a process for the continuous preparation of ammonium paratungstate hydrate by back reextraction of a tungsten-laden organic phase with an ammonia-containing aqueous solution in a mixer-settler apparatus. The reextraction is carried out at an $NH_3$:W molar ratio of from 0.83 to 1.30, and a volume feed ratio of the tungsten-laden organic phase to the ammonia-containing aqueous solution of from 5 to 25. The above crystalline is in high purity and in high yield. The production method can be carried out in a simple and energy-efficient manner.

20 Claims, 6 Drawing Sheets

U.S. PATENT DOCUMENTS

| | | | |
|---|---|---|---|
| 4,092,400 A | | 5/1978 | Zbranek et al. |
| 4,175,109 A | * | 11/1979 | Kim ................................ 423/54 |
| 4,279,869 A | * | 7/1981 | Coulson ........................... 423/54 |
| 4,346,061 A | * | 8/1982 | Goddard .......................... 423/56 |
| 4,448,755 A | * | 5/1984 | Scheithauer et al. ............ 423/56 |
| 4,450,144 A | | 5/1984 | Laferty et al. |
| 4,508,701 A | * | 4/1985 | Goddard et al. ................. 423/61 |
| 4,612,183 A | * | 9/1986 | Kim et al. ................. 423/594.13 |
| 4,613,182 A | * | 9/1986 | Stone .......................... 296/186.4 |
| 4,623,534 A | * | 11/1986 | Scheithauer et al. .... 423/594.13 |
| 4,624,844 A | * | 11/1986 | Scheithauer et al. .... 423/594.13 |
| 4,882,131 A | * | 11/1989 | Powers et al. .................... 423/54 |
| 4,963,336 A | * | 10/1990 | Beckstead et al. .............. 423/56 |
| 5,417,945 A | * | 5/1995 | Gingerich et al. .............. 423/56 |

OTHER PUBLICATIONS

English language translation of DE1150962 First Publsihed 1963.*

Haehnert, "Kristallographische Untersuchung der Ammoniumparawolframate" [Crystallogrphic tests of the ammonium paratungstate]. Zeitschrift fuer Kristallographie, vol. 120, 1964, pp. 216-228.

Basu et al., "Characterization of various commercial forms of ammonium paratungstate powder". Journal of Materials Science, 1975, vol. 10,, pp. 571-577.

Zelikman, et al, "Metallurgie der seltenen Metalle" [Metallurgy of the rare metal], Verlag Metallurgia (UdSSR), 1978, pp. 62-63.

Hempel, et al., "Loeslishkeit und stabile Kristallhydrate im System Ammoniumparawolframat-Wasser", Kristall und Technik, Bd. 2, 1967, Nr. 3, pp. 437-445.

Han, et al., "Synthesis of the Hexagonal Form of Tungsten Trioxide from Peroxopolytungstate via ammonium Paratungstate Decahydrate". Bulletin of the Chemical sicety of Japan, vol. 71, 1998, pp. 933-937.

U.S. Appl. No. 12/524,968, filed Jul. 29, 2009, Viktor Stoller et al.

U.S. Appl. No. 12/524,976, filed Jul. 29, 2009, Viktor Stoller et al.

* cited by examiner

METHOD FOR PRODUCING AMMONIUM PARATUNGSTATE HYDRATES AND AMMONIUM PARATUNGSTATE DECAHYDRATE

RELATED APPLICATIONS

This application is a national stage application (under 35 U.S.C. §371) of PCT/EP2008/050995, filed Jan. 29, 2008, which claims benefit of German application 10n 2007 005 286.5, filed Feb. 2, 2007.

BACKGROUND OF THE INVENTION

The present invention relates to a novel process for preparing highly pure ammonium paratungstate hydrates and ammonium paratungstate decahydrate having a selected crystal structure.

Ammonium paratungstate hydrates (hereinafter referred to as APTs) are known intermediates for producing tungsten metal, tungsten-containing catalysts or hard materials based on tungsten, for example tungsten carbides.

The preparation of highly pure APT is carried out essentially via acid or alkali digestion or fusion of tungsten-containing concentrates or tungsten scrap with subsequent purification stages involving precipitation processes and liquid-liquid extraction. The purified solution is generally concentrated by evaporation, resulting in APT finally crystallizing out.

The publication "Kristallographische Untersuchung der Ammoniumparawolframate (Zeitschrift für Kristallographie, vol. 120, pp. 216-228 (1964))" by M. Hähnert states that $APT \times 10H_2O$ is formed on slow evaporation of an ammonium tungstate solution prepared from $WO_3$ and $NH_3$ solution. The crystals have an acicular morphology. The bulk density of the product is 0.7 $g/cm^3$. This is not an industrial process but a preparative laboratory process.

Further routes to the preparation of $APT \times 10H_2O$ are described in the article "Characterisation of various commercial forms of ammonium paratungstate powder, Journal of Material Science, No. 10 (1975), pages 571-577".

In one process variant, an ammonium tungstate solution prepared from tungstic acid and an excess of $NH_3$ solution is subject to freeze drying. The product formed has a crumbly poorly defined crystal morphology and the bulk density is 1.03 $g/cm^3$. In a second process variant, an ammonium tungstate solution prepared as described above is slowly neutralized with HCl solution at room temperature. The acicular crystals formed have a length of 16-70 µm and a width of 2-14 µm and the bulk density is 1.46 $g/cm^3$. Both processes form $APT \times 10H_2O$ having a low bulk density and the necessary product purity can be achieved only when using clean tungstic acid. In addition, a freeze drying procedure in one case and the use of clean HCl solution in the other case leads to very high process costs. When HCl is used, the product is contaminated with chloride as a result of the process.

In the specialist book "Metallurgie der seltenen Metalle, Seligman, Krejn and Samsonov (1978), Metallurgia publishers (USSR), pp. 62-63", an industrial process for preparing $APT \times 10H_2O$ is described as follows. Scheelite concentrate is digested with HCl solution at 90-100° C. so as to form tungstic acid. The tungstic acid is subsequently dissolved in $NH_3$ solution and the solution is cooled. The resulting ammonium tungstate solution is slowly neutralized with HCl solution to a pH of 7.3-7.4 while stirring. After allowing to stand for 24 hours, the $APT \times 10H_2O$ product is separated off. The acicular crystals have a length of 15-25 µm and a width of 1-3 µm and the bulk density is 0.98 $g/cm^3$. The crystallization yield here is 85-90%.

This product still contains considerable amounts of impurities. A further disadvantage of this process is the high consumption of clean HCl solution and the large amount of W-containing $NH_4Cl$ solution (mother liquor) which has to be worked up.

FIG. 1 depicts a scanning electron micrograph (SEM) of a product prepared by this process.

It is known that clean ammonium tungstate solutions are used for preparing highly pure W salts. These solutions are usually prepared industrially by sodium hydroxide or sodium carbonate fusion of W concentrates and subsequent precipitation of P, As, Si and Mo impurities by addition of Mg, Al salts and sodium hydrogensulfide and then carrying out a liquid-liquid extraction using amine-containing organic phases. The parasitic formation of $APT \times 10H_2O$ when a liquid-liquid reextraction with $NH_3$ solution is carried out is mentioned in U.S. Pat. No. 4,450,144 and U.S. Pat. No. 4,092,400. However, the aim of these processes is to prepare clean ammonium tungstate solution which can be converted by evaporative crystallization into $APT \times 4H_2O$. The formation of $APT \times 10H_2O$ in the reextraction in the processes mentioned has an adverse effect on the phase separation, the purity of the $APT \times 4H_2O$ product and the crystallization yield. For this reason, the abovementioned patent texts describe possible ways of reducing or preventing the formation of $APT \times 10H_2O$ crystallites in the reextraction.

A process for preparing APT via digestion of W-containing concentrates with subsequent liquid-liquid extraction of the tungsten compounds and subsequent reextraction with $NH_3$ solution is described in DE-B-1,150,962. Here too, an organic amine phase (tertiary alkylamine) is used for separating tungsten from W-containing digestion solution. According to this process, as can be seen from the accompanying example, the organic amine phase laden with 23-27 g/l of tungsten is placed in a settling apparatus in the form of a long tower and reextracted by dropwise addition of 5-29% strength $NH_3$ solution. The reextraction is carried out at an $NH_3$:W molar ratio of the starting solutions in the range from 3.6:1 to 50.1:1, depending on the embodiment, and a ratio of organic phase (OP) to aqueous $NH_3$ solution in the range from 2.1:1 to 5.5:1. The APT product formed is subsequently filtered off and dried. Carrying out the reextraction by this process leads to a finely crystalline acicular $APT \times 10H_2O$ product having OP adhering to the surface and a low bulk density of <1.0 $g/cm^3$. FIG. 2 depicts a scanning electron micrograph of a product prepared by this process. Chemical analysis of the product shows a high proportion of carbon contamination of 5000-10 000 ppm. For these reasons, the material is not suitable for further processing steps. In addition, the phase separation in the reextraction as described in DE-B-1,150,962 occurs only after long standing. This can be attributed to the finely crystalline character of the product. Owing to the high W content of the mother liquor, which is due to the $NH_3$:W molar ratio used in the reextraction, the crystallization yield in this process is not more than 65% (see abovementioned publication, experiment 4). The poor product quality, the poor phase separation and the low crystallization yield has resulted in this process not having been implemented to the present time.

For these reasons, the further developments of W reextraction from amine-containing organic phases have gone in the direction of liquid-liquid reextraction with avoidance of APT precipitation and subsequent APT production by evaporation of the clean ammonium tungstate extract solutions, as described in the abovementioned documents U.S. Pat. No. 4,450,144 and U.S. Pat. No. 4,092,400.

BRIEF SUMMARY OF THE INVENTION

A invention relates to a process for the continuous preparation of ammonium paratungstate hydrate directly in the reextraction of a tungsten-laden organic phase with an ammonia-containing aqueous solution in a mixer-settler apparatus, which comprises carrying out the reextraction at an $NH_3$:W molar ratio of from 0.83 to 1.30, and a volume feed ratio of the tungsten-laden organic phase to the ammonia-containing aqueous solution of from 5 to 25.

In the light of the prior art, it is an object of the present invention to provide a comparatively cheap and simple process which allows highly pure coarsely particulate ammonium paratungstate hydrate to be prepared with a high crystallization yield in a continuous process.

A further object of the present invention is to provide a process for preparing coarsely particulate ammonium paratungstate hydrate, in which the product crystallizes directly during the reextraction.

A still further object of the present invention is to provide a highly pure ammonium paratungstate decahydrate having a selected crystal structure and a high bulk density.

A BRIEF DESCRIPTION OF THE FIGURES

DETAILED DESCRIPTION OF THE INVENTION

Figure 1:
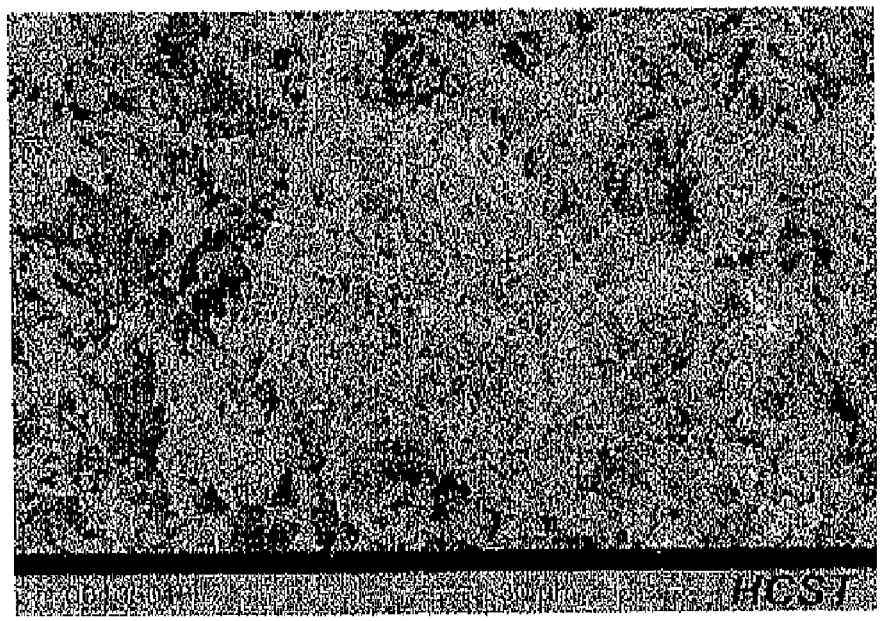
FIG. 1 illustrates a finely crystalline ammonium paratungstate decahydrate prepared as described in "Metallurgie der seltenen Metalle, Seligman, Krejn and Samsonov (1978), Metallurgia publishers (USSR), pp. 62-63".

For the purposes of the present description, the term ammonium paratungstate hydrate encompasses the tetrahydrate, i.e. $(NH_4)10[H_2W_{12}O_{42}] \times 4(H_2O)$, and the decahydrate, i.e. $(NH_4)10[H_2W_{12}O_{42}] \times 10(H_2O)$. The formation of these hydrates occurs as a function of the reextraction temperature.

No process in which coarsely crystalline APT can be crystallized directly during the reextraction has hitherto been described in the prior art. The known processes give reextraction solutions which have a high $NH_3$:W ratio and have to be concentrated by energy-consuming methods and freed of the excess of ammonia or require other measures for setting the necessary pH, e.g. by acidification with a mineral acid. In another process, APT is crystallized directly during the reextraction, but the product is very finely crystalline and difficult to free of organic impurities or has only a low purity. In addition, the resulting crystallization yield in this process is very low.

We have now surprisingly found a process which allows the isolation of coarsely crystalline highly pure APT with a very high crystallization yield directly in the reextraction.

Apart from the saving of intermediate steps and the associated saving of energy and apparatuses, the process of the invention has further advantages. It can be carried out in a simple manner and the amount of ammonia to be used is considerably lower than in known processes.

The present invention provides a process for the continuous preparation of APT directly in the reextraction of a tungsten-laden organic phase (OP) with an ammonia-containing aqueous solution (AP) in a mixer-settler apparatus, characterized in that the reextraction is carried out at an $NH_3$:W molar ratio of from 0.83 to 1.30, preferably from 0.85 to 0.95, and an OP:AP volume feed ratio of the starting materials of from 5 to 25, preferably from 10 to 15.

In a preferred embodiment, the reextraction in the mixer is carried out so that an APT solids concentration, based on the aqueous phase in the mixer, of from 100 to 1200 g/l, preferably from 500 to 800 g/l, is established.

The stirring speed in the mixer is set so that the distribution of organic phase and ammonia-containing aqueous phase is not homogeneous.

The OP and AP are generally introduced in the lower half of the mixer, preferably in the region of the stirrer, and the three-phase mixture formed is taken off from the upper region, preferably via a free overflow, and from the lower region, preferably from the region of the stirrer, so that a steady-state OP:AP phase ratio in the range from 1:5 to 1:70 is established in the mixer.

The phase separation is preferably carried out in a downstream settler apparatus equipped with stirrer while stirring slowly, with the rotational speed of the stirring device being set so that entrained OP is separated off from the APT phase during sedimentation of the APT. The phase mixture from the mixer is preferably introduced into the OP-AP phase boundary region of the settler.

A proportion of the aqueous phase formed after the phase separation (mother liquor) is preferably recirculated to the mixer so that an APT solids concentration of 100-1200 g/l, preferably 500-800 g/l, is established in the mixer.

The feed rates of the starting solutions for the reextraction are preferably selected so that an OP residence time in the mixer of at least one minute and an AP residence time of more than 3 hours are established, with the OP residence time being 60 times the ratio of the volume of the OP in the mixer in liters to the feed rate of the OP in liters/hour and the AP residence time being the ratio of the volume of the AP in the mixer in liters to the feed rate of the AP in liters/hour.

The idea of the preferred embodiment of the process of the invention is to set a phase distribution between organic and aqueous phases which is inhomogeneous over the height of the mixer in the reextraction of a tungsten-laden organic phase, to set a selected feed ratio of the starting materials and a selected molar ratio of ammonia and tungsten in the streams fed to the extraction apparatus and to ensure a selected residence time of the aqueous and organic phases in the extraction apparatus.

It has surprisingly been found that carrying out the reextraction using a low $NH_3$:W molar ratio, a high proportion of aqueous phase in the steady-state phase mixture in the mixer with an inhomogeneous phase distribution and a high APT solids content leads to a highly pure granular APT product.

It is also surprising that combined taking-off of the phase mixture from the upper third and from the region of the stirrer in the mixer at appropriately chosen ratios of the two discharge streams and in combination with the rotational speed of the stirrer enables the required steady-state phase ratio in the mixer to be set independently of the feed ratio of the OP/AP starting solutions.

The process of the invention is preferably carried out in a mixer apparatus which is equipped with an adjustable stirrer and combined taking off of product from the upper region, preferably via a free overflow, and from the lower region, preferably from the region of the stirrer, and a settler apparatus which is equipped with a slow-running stirrer.

Figure 3:
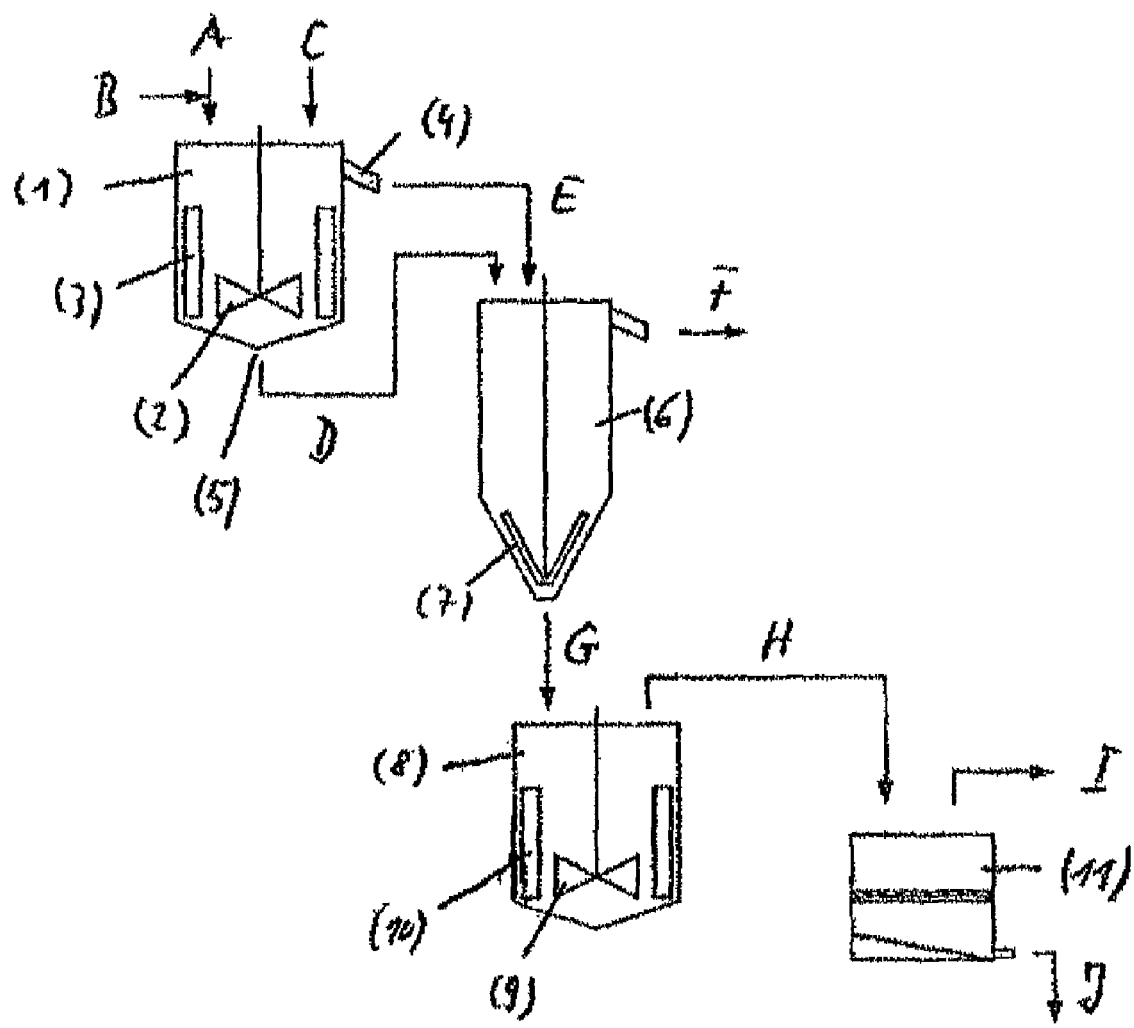
FIG. 3 illustrates an embodiment of the process of the invention for preparing APT.

A preferred embodiment for carrying out the process of the invention is shown in FIG. 3.

It has been found that all the measures in the process of the invention which are described in claim 1 are essential for achieving the intended purpose and that the measures in the process of the invention which are described in the dependent claims are particularly advantageous for achieving the intended purpose.

Thus, an $NH_3$:W molar ratio of <0.83 leads not only to a deterioration in the reextraction yield and phase separation but to formation of deposits on plant components contacted by the OP. An $NH_3$:W molar ratio of >1.30 leads to a reduction in the crystallization yield and a deterioration in the product purity.

A steady-state ratio in the mixer of OP:AP of >1:5 leads to formation of a finely crystalline acicular product having a very high proportion of carbon contamination and to a deterioration in the phase separation. A steady-state OP:AP ratio in the mixer of <1:70, on the other hand, leads to a reduction in the reextraction yield and to formation of deposits on plant components contacted by the OP.

Setting of an OP/AP phase feed ratio of the starting materials of <5:1 leads to formation of a metastable aqueous phase which leads to crystallization of APT on the walls of the apparatuses/pipes. A phase ratio of >25:1, on the other hand, leads to a drastic increase in impurity contents in the product.

In the case of a homogeneous phase distribution in the mixer, it is not possible to set the steady-state phase ratio in the mixer independently of the phase feed ratio of the starting materials.

The type of APT formed is dependent on the reextraction temperature. At temperatures up to 60° C., the decahydrate is formed, while at temperatures above 60° C., the tetrahydrate is formed. The preferred temperature for the preparation of decahydrate is from 45 to 55° C. and that for the preparation of tetrahydrate is from 80 to 98° C.

In a preferred variant of the process of the invention, a proportion of the aqueous phase (mother liquor) formed after phase separation in the settler is recirculated to the mixer, so that an APT solids concentration in the mixer of from 100 to 1200 g/l, preferably from 500 to 800 g/l, is established.

A steady-state solids content in the vessel of <100 g/l leads to formation of deposits on the walls of the apparatuses/pipes. A steady-state solids content in the vessel of >1200 g/l, on the other hand, leads to an increase in carbon contamination in the product, to a deterioration of phase separation and to finely crystalline end products.

In a likewise preferred variant of the process of the invention, the starting solution and the ammonia-containing aqueous solution are introduced into the stirrer region of the mixer. Introduction of the starting solution and the ammonia-containing aqueous solution(s) into the stirrer region leads to an improvement in the reextraction yield and to a decrease in deposits on the walls of the apparatuses/pipes.

In a further preferred variant of the process of the invention, the feed rates of the starting solutions to the reextraction are selected so that an OP residence time in the mixer of at least one minute and an AP residence time of more than three hours are established, with the OP residence time being 60 times the ratio of the volume of the OP in the mixer in liters to the feed rate of the OP in liters/hour and the AP residence time is the ratio of the volume of the AP in the mixer in liters to the feed rate of the AP in liters/hour.

An OP residence time in the mixer of less than 1 minute leads to a reduction in the reextraction yield and to formation of deposits on plant components which come into contact with OP. An OP residence time in the vessel of more than 10 minutes is unfavorable because of the deterioration in the space-time yield.

An AP residence time in the mixer of less than 3 hours leads to a finely crystalline product, to a reduction in the crystallization yield and to formation of deposits on the walls of the apparatuses/pipes. An AP residence time in the mixer of more than 10 hours, on the other hand, leads, at comparable product properties and crystallization yields, to a reduction in the space-time yield.

The phase mixture from the mixer is advantageously introduced into the settler in the vicinity of the OP/AP boundary, so that entrainment of OP in the sedimentation of APT is drastically reduced. In addition, phase separation is carried out with slow stirring, so that OP entrained by the product is separated off.

Furthermore, separation of the phase mixture with slow stirring leads to a significant reduction in the separation time and thus to an increase in the space-time yield in the settler.

The organic phase comprises, for example, 7% by weight of diisotridecylamine, from 10 to 15% by weight of isodecanol and 78-83% by weight of an aliphatic hydrocarbon mixture (e.g. petroleum spirit K60) and is laden in a manner known to those skilled in the art with from 40 to 80 g/l of tungsten, preferably from 60 to 70 g/l. Apart from secondary amines, it is also possible to use tertiary amines or quaternary ammonium salts and other modifiers instead of isodecanol and also other hydrocarbon mixtures, including those having other composition ratios.

The invention also provides a novel ammonium paratungstate decahydrate which comprises at least 75% of crystals having a length of at least 200 μm and having a ratio of length to width of <4.5:1. Such a product can be prepared by the above-described process. In contrast to previously known products, this product is significantly coarser, has smaller amounts of impurities and can be more readily processed further.

The ammonium paratungstate decahydrate of the invention preferably has a bulk density of at least 1.7 g/cm$^3$, in particular from 1.8 to 2.2 g/cm$^3$. Such bulk densities could not hitherto be obtained for this product.

The bulk density was determined in accordance with ASTM B329.

The ammonium paratungstate decahydrate preferably has a length of from 200 to 1000 μm, particularly preferably from 300 to 400 μm.

The ammonium paratungstate decahydrate likewise preferably has a length of from 300 to 400 μm and a ratio of length to width of from 3.0:1 to 3.5:1.

This ammonium paratungstate decahydrate is particularly preferred as high-purity product, for example characterized by a purity of at least 99.99%, based on the total mass of the product.

Figure 4:
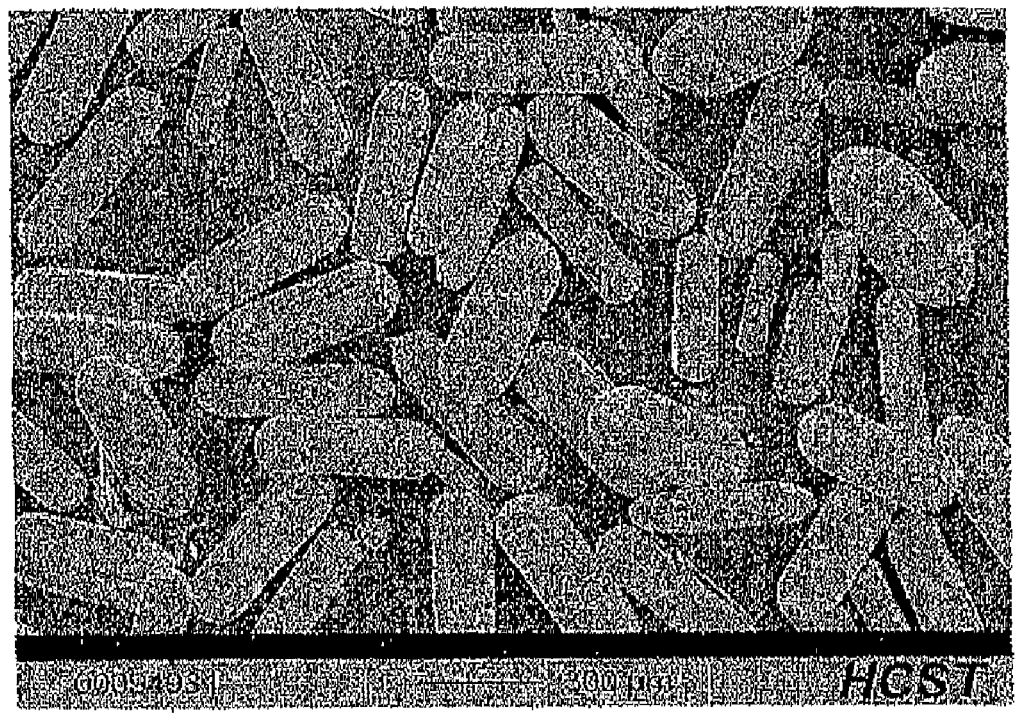
FIG. 4 illustrates an APT decahydrate prepared by the process of the invention (scanning electron micrograph (SEM)).

The invention is described in FIG. 4 and the following example. Restriction to this example and this figure is not implied thereby.

The figures show:

FIG. 1: a finely crystalline ammonium paratungstate decahydrate prepared as described in "Metallurgic der seltenen Metalle, Seligman, Krejn and Samsonov (1978), Metallurgia publishers (USSR), pp. 62-63".

Figure 2:
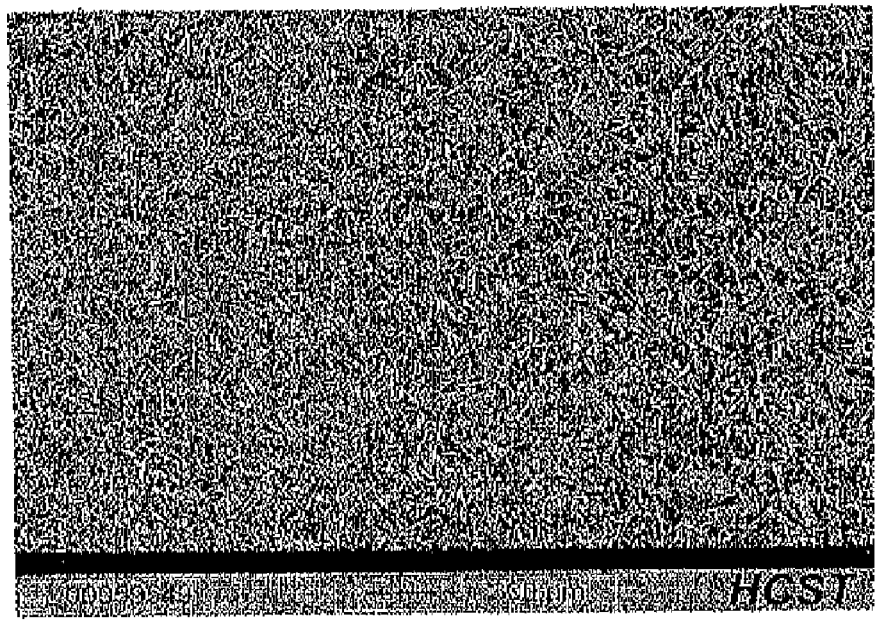
FIG. 2 illustrates a finely crystalline ammonium paratungstate decahydrate prepared as described in DE-B-1,150,962.

FIG. 2: a finely crystalline ammonium paratungstate decahydrate prepared as described in DE-B-1,150,962.

FIG. 3: an embodiment of the process of the invention for preparing APT.

FIG. 4: an APT decahydrate prepared by the process of the invention (scanning electron micrograph (SEM)).

FIG. 5: an APT decahydrate prepared by the process of the invention (X-ray diffraction pattern (XRD)).

EXAMPLE

W concentrate was digested by means of sodium hydroxide and the liquor formed was subjected to preliminary removal of impurities such as P, As, Si, V and Mo by addition of Mg salts, Al salts and sodium hydrogen-sulfide. As further purification step to remove anionic and cationic impurities still present, a liquid-liquid extraction using an organic phase (7-10% by weight of diisotridecylamine, 10% by weight of isodecanol, balance: petroleum spirit) was carried out. The OP laden with tungsten was reextracted using $NH_3$ solution. The apparatus used for this purpose is shown in FIG. 3.

400 l/h of W-laden OP and a regulated amount of $NH_3$ solution were fed continuously into the stirrer region of a stirred vessel (1) equipped with stirrer (2) and baffles (3) (also referred to as mixer) (volume: 250 l, diameter: 600 mm, inclined-blade stirrer: 6 blades, diameter: 300 mm, 4 baffles) via lines A, B and C. Water was introduced via line B. The W concentration of the OP and the $NH_3$ concentration of the $NH_3$ solution was measured automatically in-line. The metering of the $NH_3$ solution was regulated automatically via the $NH_3$:W molar ratio set at 0.90. The OP/($NH_3$ solution+water) feed ratio was set to 15:1 and likewise regulated automatically via the water flow (B) into the $NH_3$ feed line (A).

The volume flow of the OP (average W loading: 62.0 g/l) was set to a fixed value. The volume flow of the $NH_3$ solution was regulated as a function of the volume flow of the OP, the instantaneously measured W and $NH_3$ concentrations and the $NH_3$:W molar ratio set. The $H_2O$ volume flow was regulated as a function of the volume flow of the $NH_3$ solution and the feed ratio of the starting materials set. The temperature in the mixer (1) was set to 50° C. and regulated via temperature control of the feed solutions.

The transfer of the 3-phase mixture formed in the mixer (1) to the settler (6) was effected from the stirrer region of the vessel via the outlet (5) and line D and also via the free overflow (4) of the vessel and line E.

The steady-state OP/AP ratio of 1/8 in the mixer (1) and the steady-state solids concentration of 750 g/l based on the aqueous phase ($NH_3$ solution+mother liquor+water) was set via the rotational speed of the stirrer (210 rpm), the offtake of phase mixture from the lower region of the mixer (50 l/h) and the recirculation of aqueous phase (mother liquor) from the settler (6) to the mixer (1) (20 l/h). The residence time of the AP in the mixer (1) was 4.8 hours based on the steady-state proportion of AP in the mixer and that of the OP was 4.2 minutes based on the steady-state proportion of OP in the mixer. The phase mixture was separated in the settler (6) equipped with a slow-running stirrer (7) (volume: 600 l, diameter: 750 mm (shape: conically tapering above half the height; equipped with a slow-running stirrer of the anchor type running around the wall (tapered obliquely)). The rotational speed of the slow-running stirrer was set to 15 rpm. The stripped OP was separated off via the overflow of the settler via line F, washed with water and recirculated to the loading stage of the liquid-liquid extraction. The product suspension having an APT solids content of 1314 g/l was transferred from the lower region of the settler (6) via line G into an intermediate vessel (8) equipped with stirrer (9) and baffles (10) as buffer vessel prior to filtration. From there, the aqueous APT suspension was transferred via line H into the filter (11) and the APT×$10H_2O$ was washed with a little water in order to displace the mother liquor. The product was taken from the filter and finally dried at 50° C. and characterized.

The mother liquor containing 35 g/l of W and 7.0 g/l of $NH_3$ was discharged from the filter (11) via line J and, after removal of the $NH_3$, added to the digestion solution for the W concentrates. The crystallization yield based on the W content of the OP is 96.2%.

The APT×$10H_2O$ obtained as described in this example has a very high purity of >99.99%. The analyses of different daily batches of this product are shown in the following table. FIG. 4 shows a scanning electron micrograph of the product prepared in the example.

TABLE

Chemical analysis and bulk density of various daily batches of the product prepared as described in the example.

| Sample | W [%] | $NH_3$ [%] | F [ppm] | C [ppm] | P [ppm] | Si [ppm] | Al [ppm] | Ca [ppm] | Cr [ppm] |
|---|---|---|---|---|---|---|---|---|---|
| 1 | 68.36 | 5.23 | <10 | 18 | <1 | <2 | <3 | <3 | <2 |
| 2 | 68.63 | 5.24 | <10 | 29 | <1 | <2 | <3 | <3 | <2 |
| 3 | 68.67 | 5.27 | <10 | 23 | <1 | <2 | <3 | <3 | <2 |

| Sample | Fe [ppm] | K [ppm] | Li [ppm] | Mo [ppm] | Na [ppm] | V [ppm] | Bulk density [g/cm$^3$] |
|---|---|---|---|---|---|---|---|
| 1 | <2 | <1 | <1 | <3 | <1 | <1 | 1.98 |
| 2 | <2 | <1 | <1 | <3 | <1 | <1 | 2.12 |
| 3 | <2 | <1 | <1 | <3 | <1 | <1 | 1.79 |

Figure 5A:
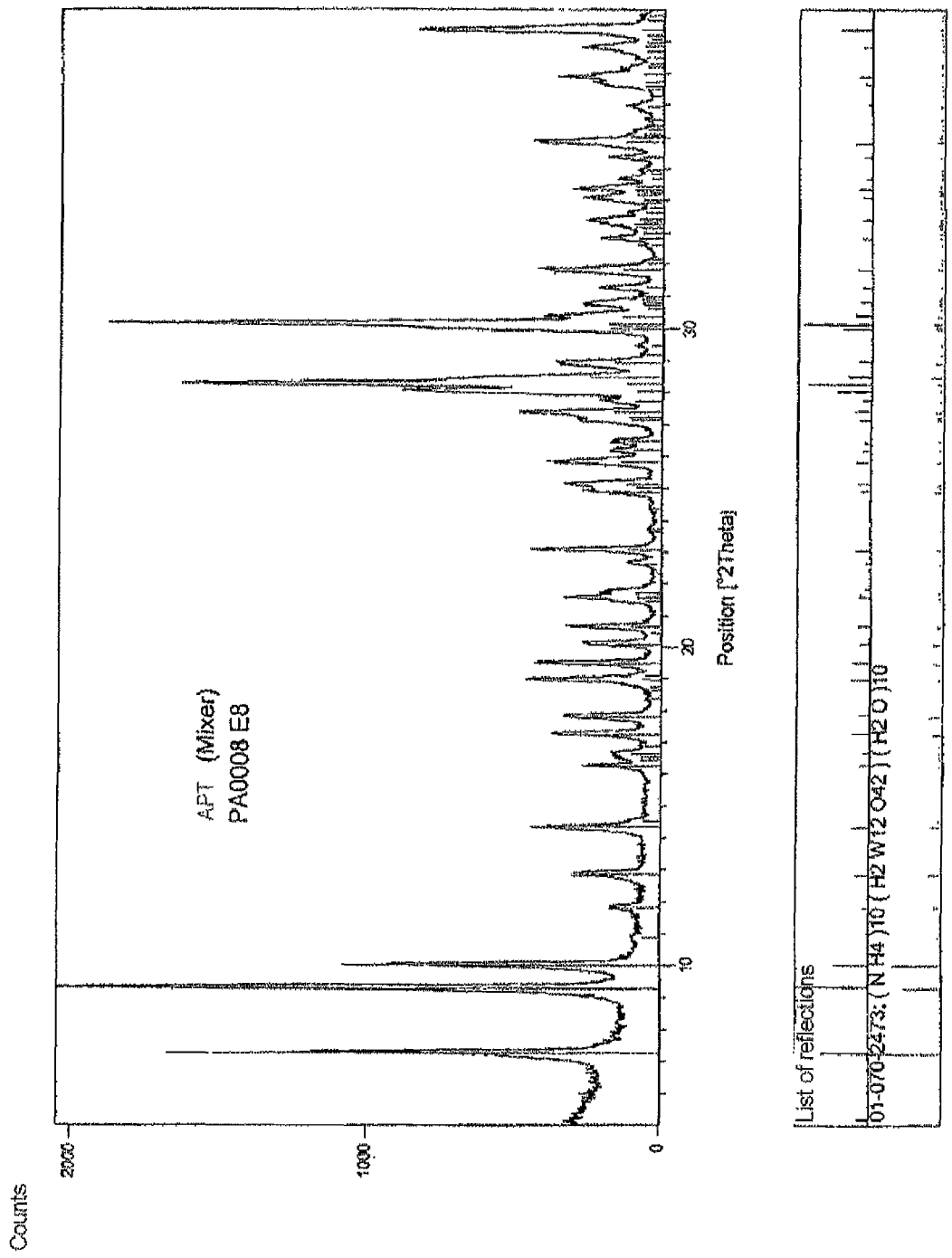
FIG. 5 illustrates an APT decahydrate prepared by the process of the invention (X-ray diffraction pattern (XRD)).
Figure 5B:
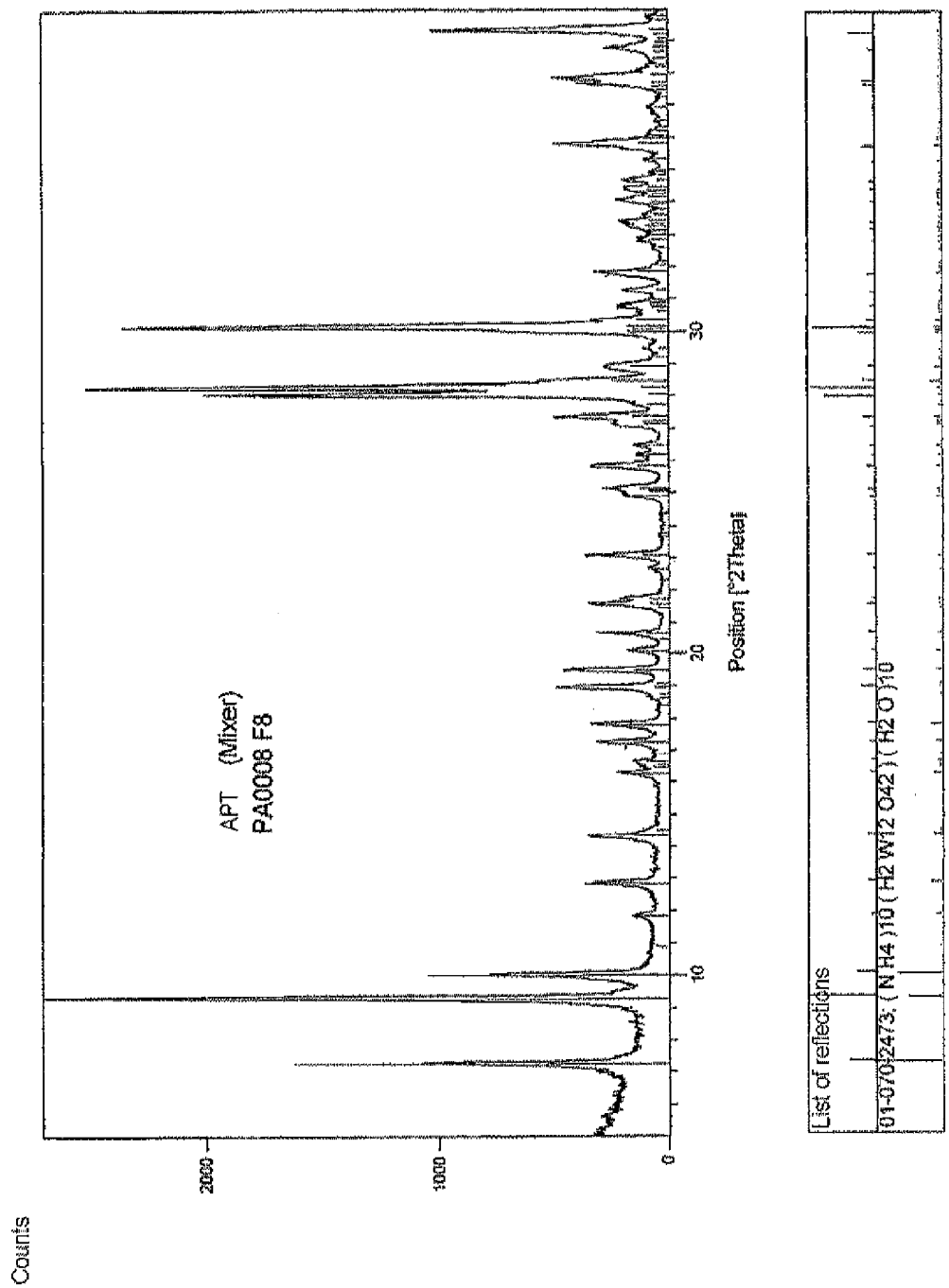
Figure 5C:
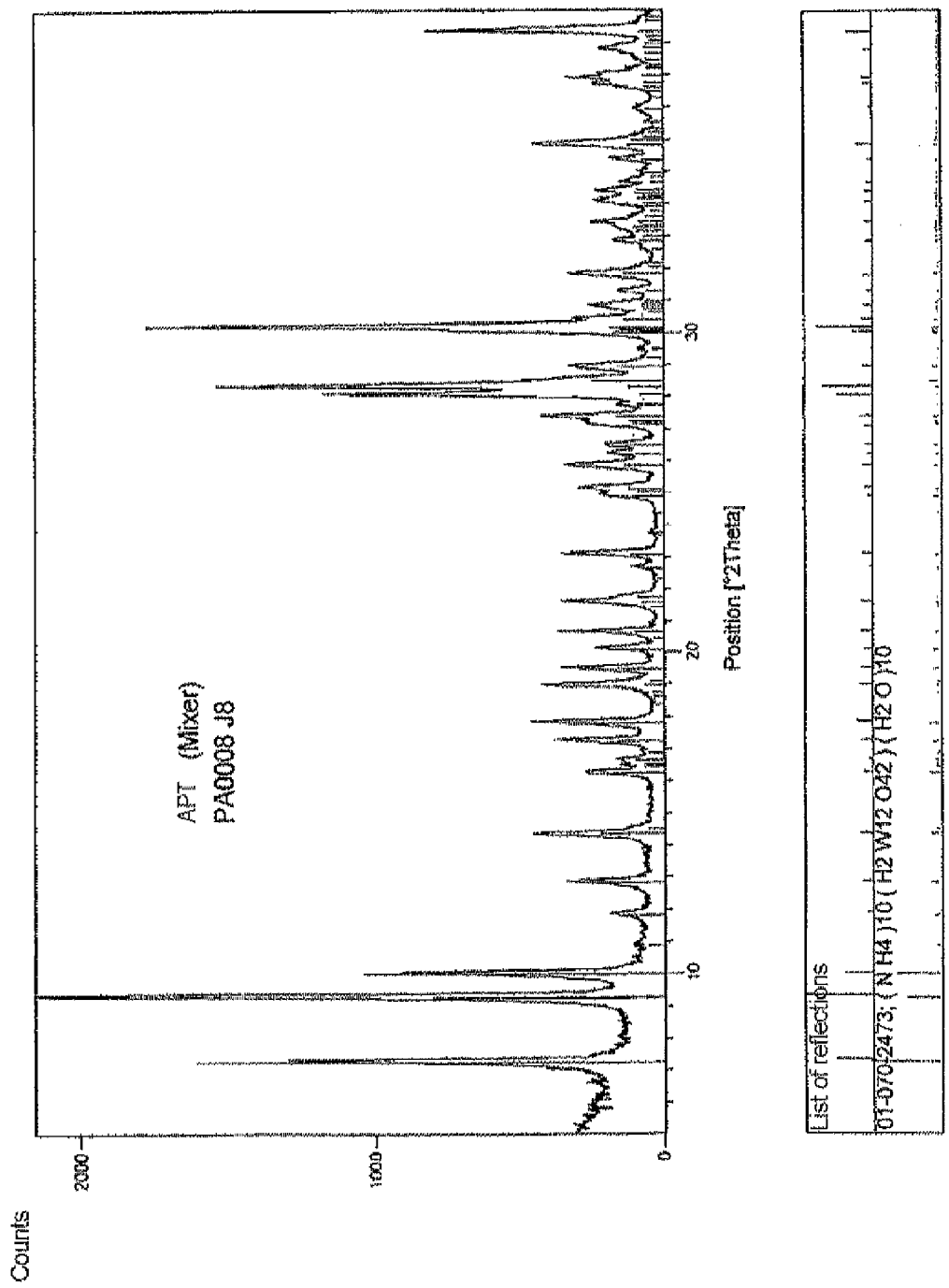

The associated X-ray diffraction patterns (XRD) of the three samples are depicted in FIGS. 5a to 5c.

The invention claimed is:

1. A process for the continuous preparation of ammonium paratungstate hydrate directly in the reextraction of a tungsten-laden organic phase with an ammonia-containing aqueous solution in a mixer-settler apparatus, which comprises carrying out the reextraction at an $NH_3$:W molar ratio of from 0.83 to 1.30, and a volume feed ratio of the tungsten-laden organic phase to the ammonia-containing aqueous solution of from 5 to 25 wherein the reextraction in the mixer is carried out so that a solids concentration of the ammonium paratungstate hydrate, based on the ammonia-containing aqueous phase in the mixer, of from 100 to 1200 g/l, is established and which further comprises a stirrer and wherein the stirrer speed in the mixer is set so that an inhomogeneous distribution of organic phase and ammonia-containing aqueous phase is obtained in the mixer.

2. The process as claimed in claim 1, wherein the reextraction is carried out at an $NH_3$:W molar ratio of from 0.85 to 0.95 and a volume feed ratio of the tungsten-laden organic phase to the ammonia-containing aqueous solution of from 10 to 15.

3. The process as claimed in claim 2, wherein the reextraction in the mixer is carried out so that a solids concentration of the ammonium paratungstate hydrate, based on the ammonia-containing aqueous phase in the mixer, of from 500 to 800 g/l, is established.

4. A process for the continuous preparation of ammonium paratungstate hydrate directly in the reextraction of a tungsten-laden organic phase with an ammonia-containing aqueous solution in a mixer-settler apparatus, which comprises carrying out the reextraction at an $NH_3$:W molar ratio of from 0.83 to 1.30, and a volume feed ratio of the tungsten-laden organic phase to the ammonia-containing aqueous solution of from 5 to 25 wherein the reextraction in the mixer is carried out so that a solids concentration of the ammonium paratungstate hydrate, based on the ammonia-containing aqueous phase in the mixer, of from 100 to 1200 g/l, is established and wherein the tungsten-laden organic phase and the ammonia-containing aqueous solution are introduced into the lower half of the mixer, and in that a three-phase mixture is formed and is taken off both from the upper region, and from the lower region of the mixer, so that a stationary ratio of tungsten-laden organic phase (OP) and ammonia-containing aqueous solution (AP) in a phase ratio (OP:AP) in the range from 1:5 to 1:70 is established in the mixer.

5. A process for the continuous preparation of ammonium paratungstate hydrate directly in the reextraction of a tungsten-laden organic phase with an ammonia-containing aqueous solution in a mixer-settler apparatus, which comprises carrying out the reextraction at an $NH_3$:W molar ratio of from 0.83 to 1.30, and a volume feed ratio of the tungsten-laden organic phase to the ammonia-containing aqueous solution of from 5 to 25 wherein the reextraction in the mixer is carried out so that a solids concentration of the ammonium paratungstate hydrate, based on the ammonia-containing aqueous phase in the mixer, of from 100 to 1200 g/l, is established and wherein the tungsten-laden organic phase and the ammonia-containing aqueous solution are introduced into a stirrer region of the mixer and in that a three-phase mixture is formed and is taken off both from the upper region, via a free overflow, and from the stirrer region, of the mixer, so that a stationary ratio of tungsten-laden organic phase (OP) and ammonia-containing aqueous solution (AP) in a phase ratio (OP:AP) in the range from 1:5 to 1:70 is established in the mixer.

6. A process for the continuous preparation of ammonium paratungstate hydrate directly in the reextraction of a tungsten-laden organic phase with an ammonia-containing aqueous solution in a mixer-settler apparatus, which comprises carrying out the reextraction at an $NH_3$:W molar ratio of from 0.83 to 1.30, and a volume feed ratio of the tungsten-laden organic phase to the ammonia-containing aqueous solution of from 5 to 25 wherein the reextraction in the mixer is carried out so that a solids concentration of the ammonium paratungstate hydrate, based on the ammonia-containing aqueous phase in the mixer, of from 100 to 1200 g/l, is established and wherein a separation of a phase mixture containing the organic phase and the aqueous phase from the mixer is carried out with stirring in a settler provided with a stirrer and in that the rotational speed of a the stirrer is set so that the organic phase entrained in the sedimentation of the ammonium paratungstate hydrate is separated off, with a phase mixture from the mixer being introduced into the phase boundary region between organic phase and aqueous phase of the settler.

7. The process as claimed in claim 1, wherein a mother liquor of the aqueous phase is formed after a phase separation and a proportion of the mother liquor is fed into the mixer so that a solids concentration of ammonium paratungstate hydrate of 100-1200 g/l is established in the mixer.

8. The process as claimed in claim 1, wherein a mother liquor of the aqueous phase is formed after a phase separation and a proportion of the mother liquor is fed into the mixer so that a solids concentration of ammonium paratungstate hydrate of 500-800 g/l, is established in the mixer.

9. The process as claimed in claim 1, wherein the feed rates of the tungsten-laden organic phase and ammonia-containing aqueous solution to the reextraction are selected so that a residence time of the organic phase in the mixer of at least one minute and a residence time of ammonia-containing aqueous phase in the mixer of more than three hours is established, with the residence time of the organic phase being 60 times the ratio of the volume of the organic phase in the mixer in liters to the feed rate of the tungsten-laden organic phase in liters/hour and the residence time of the ammonia-containing aqueous phase being the ratio of the volume of the ammonia-containing aqueous phase in the mixer in liters to the feed rate of the ammonia-containing aqueous solution in liters/hour.

10. The process as claimed in claim 4, wherein the reextraction is carried out at an $NH_3$:W molar ratio of from 0.85 to 0.95 and a volume feed ratio of the tungsten-laden organic phase to the ammonia-containing aqueous solution of from 10 to 15.

11. The process as claimed in claim 10, wherein the reextraction in the mixer is carried out so that a solids concentration of the ammonium paratungstate hydrate, based on the ammonia-containing aqueous phase in the mixer, of from 500 to 800 g/l, is established.

12. The process as claimed in claim 4, wherein a proportion of a mother liquor is formed after a phase separation and a proportion of the mother liquor is fed into the mixer so that a solids concentration of ammonium paratungstate hydrate of 500-800 g/l, is established in the mixer.

13. The process as claimed in claim 4, wherein the feed rates of the tungsten-laden organic phase and ammonia-containing aqueous solution to the reextraction are selected so that a residence time of the organic phase in the mixer of at least one minute and a residence time of ammonia-containing aqueous phase in the mixer of more than three hours is established, with the residence time of the organic phase being 60 times the ratio of the volume of the organic phase in the mixer in liters to the feed rate of the tungsten-laden organic phase in liters/hour and the residence time of the ammonia-containing aqueous phase being the ratio of the volume of the ammonia-containing aqueous phase in the mixer in liters to the feed rate of the ammonia-containing aqueous solution in liters/hour.

14. The process as claimed in claim 5, wherein the reextraction is carried out at an $NH_3$:W molar ratio of from 0.85 to 0.95 and a volume feed ratio of the tungsten-laden organic phase to the ammonia-containing aqueous solution of from 10 to 15.

15. The process as claimed in claim 14, wherein the reextraction in the mixer is carried out so that a solids concentration of the ammonium paratungstate hydrate, based on the ammonia-containing aqueous phase in the mixer, of from 500 to 800 g/l, is established.

16. The process as claimed in claim 5, wherein a mother liquor of the aqueous phase is formed after a phase separation and a proportion of the mother liquor is fed into the mixer so that a solids concentration of ammonium paratungstate hydrate of 500-800 g/l, is established in the mixer.

17. The process as claimed in claim 5, wherein the feed rates of the tungsten-laden organic phase and ammonia-containing aqueous solution to the reextraction are selected so that a residence time of the organic phase in the mixer of at least one minute and a residence time of ammonia-containing aqueous phase in the mixer of more than three hours is established, with the residence time of the organic phase being 60 times the ratio of the volume of the organic phase in the mixer in liters to the feed rate of the tungsten-laden organic phase in liters/hour and the residence time of the ammonia-containing aqueous phase being the ratio of the volume of the ammonia-containing aqueous phase in the mixer in liters to the feed rate of the ammonia-containing aqueous solution in liters/hour.

18. The process as claimed in claim 5, wherein the reextraction is carried out at an NH3:W molar ratio of from 0.85 to 0.95 and a volume feed ratio of the tungsten-laden organic phase to the ammonia-containing aqueous solution of from 10 to 15.

19. The process as claimed in claim 18, wherein the reextraction in the mixer is carried out so that a solids concentration of the ammonium paratungstate hydrate, based on the ammonia-containing aqueous phase in the mixer, of from 500 to 800 g/l, is established.

20. The process as claimed in claim 5, wherein a mother liquor is formed after a phase separation and a proportion of the mother liquor of the aqueous phase is fed into the mixer so that a solids concentration of ammonium paratungstate hydrate of 500-800 g/l, is established in the mixer.

* * * * *